United States Patent [19]

Marquisee

[11] 3,954,678

[45] May 4, 1976

[54] SEMIPERMEABLE MICROCAPSULES CONTAINING A SILICA GEL

[75] Inventor: Mark James Marquisee, Wilmington, Del.

[73] Assignee: E. I. Du Pont de Nemours and Company, Wilmington, Del.

[22] Filed: July 11, 1974

[21] Appl. No.: 487,814

[52] U.S. Cl............................ 252/451; 252/62.53; 252/429 B; 252/448; 252/477 R
[51] Int. Cl.$^2$...................... B01J 21/08; B01J 37/00
[58] Field of Search................ 252/429 B, 448, 449, 252/451, 62.53

[56] References Cited
UNITED STATES PATENTS

| | | | |
|---|---|---|---|
| 2,697,066 | 12/1954 | Sieg | 252/451 X |
| 2,971,916 | 2/1961 | Schleicher et al. | 252/62.53 |
| 3,041,289 | 6/1962 | Katchen et al. | 252/62.53 X |
| 3,331,786 | 7/1967 | Bleuenstein | 252/449 X |
| 3,661,620 | 5/1972 | Dekking et al. | 161/DIG. 5 |
| 3,737,337 | 6/1973 | Schnoring et al. | 252/448 X |

*Primary Examiner*—Carl F. Dees

[57] ABSTRACT

Described are semipermeable microcapsules which comprise an outer semipermeable polymeric skin encapsulating a silica gel. These microcapsules may be used as chromatographic media or may be modified to contain a homogeneous or heterogeneous catalyst and/or a ferromagnetic material.

11 Claims, No Drawings

SEMIPERMEABLE MICROCAPSULES CONTAINING A SILICA GEL

BACKGROUND OF THE INVENTION

1. Field of the Invention

This invention relates to semipermeable microcapsules containing silica gel.

2. Description of the Prior Art

The immobilization of enzymes (homogeneous catalysts) by encapsulation within permanent, semipermeable microcapsules was first reported by Chang (Science, Vol. 146, p. 524, 1964) who employed interfacial polycondensation to prepare polyamide membranes enclosing solutions containing various enzymes. In subsequent work a number of enzymes have been encapsulated within semipermeable membranes. In *Biotechnol. and Bioeng. Symp.*, No. 3, pp. 395–399, John Wiley & Sons, Inc. (1972) Chang teaches that, when microencapsulating enzymes in semipermeable membranes, it is important that the enzyme be dissolved in a hemoglobin or hemolysate solution before microencapsulation.

In a copending application of M. J. Marquisee and W. W. Prichard, Ser. No. 487,815, filed on even date, semipermeable microcapsules containing a finely divided heterogeneous catalyst and a ferromagnetic material are described and claimed.

SUMMARY OF THE INVENTION

The products of this invention are semipermeable microcapsules which comprise an outer semipermeable polymeric skin encapsulating a silica gel. It has been found that silica gel, while being sufficiently rigid that it stabilizes the structure of the microcapsule against collapsing, is sufficiently porous that the outside medium which passes through the semipermeable skin of the capsule also passes through the silica gel. This phenomenon renders the microcapsules of this invention suitable for a wide variety of uses.

DETAILED DESCRIPTION OF THE INVENTION

The invention is directed to the encapsulation of silica gel within a semipermeable membrane. By "silica gel" is meant a jelly to amorphous solid which is basically $SiO_2 \cdot nH_2O$ and which can contain small amounts of other ingredients such as, e.g., $Na_2O$.

The use of silica gel as a cell stabilizing agent increases the rigidity and reduces the resistance to flow of the capsules, and reduces the tendency of the cells to collapse. Unlike the semipermeable microcapsules of the prior art these microcapsules may be used in the dry state, or they can be dried for purposes of transporting and storage and then redispersed in a liquid medium without loss in structural stability or utility of the encapsulated components.

The microcapsules of this invention are preferably prepared by incorporating a colloidal dispersion of silica or a silica-containing solution directly into the microcapsule during the encapsulation process. Alternatively, the microcapsule may be prepared by encapsulation of an appropriate silicate ester, e.g., tetraethyl orthosilicate, with subsequent hydrolysis of the encapsulated ester to form a silica gel. Hydrolysis is preferably carried out with aqueous hydrochloric acid.

Incorporation of a silica gel into the capsule may also be accomplished by post-treatment of a microcapsule, for example, with a silicate ester which will migrate into the microcapsule followed by hydrolysis of the encapsulated ester to form a silica gel. In this preparative method certain auxiliary cell stabilizing agents, which will be referred to hereinafter as osmotica, are added during the original microcapsule preparation to allow normal separation and purification of the microcapsule without cell collapse. These osmotica are materials which are soluble in the medium and are too large to migrate out of the semipermeable membrane. They function by causing osmotic pressure to build up within the microcapsule.

Suitable osmotica include synthetic and natural polymers, as well as other materials. Suitable natural polymers include proteins, starches, acacia, natural gums, and alginates. Suitable synthetic polymers include various cellulose derivatives including cellulose ether, ethyl hydroxyethylcellulose, hydroxyethylcellulose, hydroxypropylcellulose, sodium carboxymethylcellulose, and sodium cellulose sulfate; acrylates including polyacrylic acid and its salts, polyacrylamide, acrylamide copolymers, and polymethacrylic acid and its salts; and miscellaneous synthetic polymers including polyethylene glycols, polypropylene glycols, polyethylene oxide, polyvinyl alcohol, polyvinyl methyl ether, polyvinylpyrrolidine, the alkali salt of polyvinylsulfuric acid, and polyethyleneimine. Polyethyleneimine and its salts may serve as both a component of the membrane and as an osmoticum. Preferably the osmoticum is nonproteinaceous.

The microcapsules of this invention may, if desired, contain a catalytic material, that is, a membrane-impermeable, homogeneous catalyst or a heterogeneous catalyst. By "homogeneous catalyst" is meant a catalyst which is soluble in the reaction medium in which it functions as a catalyst. The term "heterogeneous catalyst" is used herein to refer to a catalyst which is insoluble in the reaction medium in which it functions as a catalyst.

The homogeneous catalysts which may be encapsulated in accordance with this invention may be a nonbiological catalyst such as the poly(p-chlorostyrene)-supported phenyl(dipyridyl) nickel chloride described by Ikeda et al. in Jour. Org.-Met. Chem., vol. 60 (1973) C67 or a biological catalyst such as an enzyme dissolved in an aqueous phase. Suitable enzymes include amylases, amyloglucosidase, catalase, cellulase, glucanase, glucose isomerase, glucose oxidase, hemicellulase, invertase, lactase, lipase, melibiase, maltase, papain, pectinase, pentosanase, pepsin, phosphatase, proteases, rennet, collagenase, urease, carbonic anhydrase, trypsin, tyrosinase, α-chymotrypsin, luciferase, urate oxidase, uricase, L-asparaginase, and zymase. Preferred enzymes include collagenase, urease, carbonic anhydrase, trypsin, α-chymotrypsin, luciferase, urate oxidase, catalase, and L-asparaginase. It is preferred that the enzyme concentration be about 0.001–10 weight percent based on the encapsulated aqueous phase.

The heterogeneous catalysts which may be encapsulated in accordance with this invention are generally solids. Suitable heterogeneous catalysts include any insoluble catalyst which functions at temperatures below the melting point of the capsule walls. Catalysts employed for hydrogenation, e.g., nickel, palladium, platinum, ruthenium and rhodium; catalysts suitable for olefin isomerization, e.g., platinum, palladium and rhodium; oxidation catalysts, e.g., platinum and cobalt oxides; catalysts suitable for hydrosilyation of olefins such as palladium; and ion exchange resins including acidic types containing active groups such as carboxylic or sulfonic acid groups, for example, styrene-acrylic acid resins, and basic types, for example, those containing tertiary amine groups, may be successfully encapsulated. The preferred heterogeneous catalysts are those suitable for hydrogenation of olefins. The heterogeneous catalyst is encapsulated by being suspended in the phase that will end up inside the capsule.

The heterogeneous catalyst may also be formed in situ within the microcapsule by dissolving a soluble precursor of the heterogeneous catalyst in the medium which will end up inside the capsule. The capsule is then post-treated to convert the catalyst precursor to the insoluble catalyst. For example, a soluble metal salt may be dissolved in the medium during preparation of the capsule. The capsule is then treated with an agent which permeates into the capsule and reduces the metal salt to the free metal.

Another method of forming the heterogeneous catalyst in situ is to form the capsule without any heterogeneous catalyst component present, impregnate the capsule with a soluble heterogeneous catalyst precursor which will migrate into the capsule through the semipermeable skin, isolate the capsule, and treat it with a reagent which will convert the precursor to the catalyst.

The microcapsules of this invention, if desired, may also contain finely divided ferromagnetic material. By "ferromagnetic material" is meant any substance which is attracted by a magnet. Incorporation of ferromagnetic material into the microcapsules permits ready retrieval of the capsules from the reaction medium by application of a magnetic force external to the capsules. Although any ferromagnetic powder with a particular size less than 1 micron is suitable for use, acicular iron, $Fe_3O_4$, iron powder, "Alnico", nickel, cobalt, and $CrO_2$ are preferred. Ferromagnetic powders of particle size less than about 0.25 micron are preferred. A ferromagnetic liquid such as Ferrofluid (Ferrofluidics Corp.) may also be used.

When hydrolysis of a silicate ester is employed to obtain a silica gel, it is preferred that the ferromagnetic material be treated, prior to encapsulation, to prevent its reaction with HCl during the ester hydrolysis step. Colloidal ferromagnetic materials prepared by the method of Papell (NASA Tech. Note 1968, NASA-TN-D-4676) which are available from the Ferrofluidics Corporation are resistant to reaction with HCl after encapsulation.

The semipermeable microcapsules may be prepared by interfacial polycondensation, or by other well known microencapsulation techniques such as interfacial coacervation. Suitable polymers include condensation polymers formed by interfacial polycondensation as well as other polymers formed by interfacial coacervation such as polystyrene, collodion, ethylcellulose and cellulose acetate butyrate. Interfacial polycondensation is the preferred technique.

When the microcapsule is prepared by interfacial polycondensation, the capsule skin may be composed of any condensation polymer, e.g., polyamide, polyurethane, polysulfonamide, polyurea, polyester, polycarbonate, etc. Polyamides prepared by interfacial polycondensation of an amine with an acid chloride are preferred. The process of preparing microcapsules by interfacial polycondensation will be described hereinafter using polyamides as an example of the condensation polymer. Microcapsule skins can be formed from other condensation polymers in a similar manner.

In the preparation of polyamide microcapsule skins an amine is reacted with an acid chlorine by interfacial polycondensation. Suitable amines include an aliphatic or aromatic amine capable of undergoing interfacial polycondensation. Preferred are such aliphatic amines or their salts as hexamethylenediamine, ethylenediamine, piperazine, 2,5-dimethylpiperazine, 3-aminopentamethylenediamine, diethylenetriamine, 1,10-decamethylenediamine, polyethyleneimine, and aromatic amines or their salts such as m-phenylenediamine, p-phenylenediamine, 1,2,4-triaminobenzene, 1,2,4,5-tetraaminobenzene, and 4,4'-diamino-2,2'-biphenyldisulfonic acid. The amine components are normally employed as a 0.4–2.0 molar aqueous solution.

Acid chlorides suitable for use in the preparation of a polyamide skin include both aromatic and aliphatic acid chlorides capable of undergoing interfacial polycondensation. Preferred are acid chlorides obtained from aliphatic acids such as adipic acid, sebacic acid and dodecanedioic acid, and aromatic acids such as phthalic acid, isophthalic acid, terephthalic acid, trimesic acid, trimellitic acid, naphthalenedicarboxylic acids, bis(4-carboxyphenyl)methane, and bis(4-carboxycyclohexyl)methane.

The acid chloride components are normally employed as a 0.001–1.0 molar solution in a nonwater-miscible organic solvent. Suitable solvents include aliphatic, cycloaliphatic and aromatic hydrocarbons and halogen-substituted hydrocarbons and include cyclohexane, chloroform, 1,1,2-trichloro-1,2,2-trifluoroethane, mineral oil, benzene, toluene, chlorobenzene, and mixtures thereof. Silicone oil is also suitable.

In preparing the microcapsules it is necessary that a surfactant or emulsifying agent be present either in the aqueous or organic phase. Suitable emulsifying agents include polyvinyl alcohol, soaps, long chain sulfonic acids and sulfates, lyophilic colloids, and neutral lyophilic fatty acid esters.

In the general procedure for preparing the microcapsules of this invention by interfacial polycondensation, the colloidal silica or water soluble silica gel or precursor thereof, and any catalyst and/or ferromagnetic material to be included is dissolved or dispersed in a small volume of an aqueous solution containing a suitable amine or amine salt which can participate in the formation of a polyamide. A suitable organic solvent or solvent mixture containing a surface active agent is added to the aqueous suspension and the mixture is emulsified. The vigor of emulsification and the concentration of surface-active agent in the organic solvent will largely determine the diameter of the microcapsule. After the desired droplet size is achieved, additional organic solvent containing a suitable acid chloride which can participate in the formation of the polyamide is added. Interfacial polymerization is allowed to proceed until the reaction is completed, normally for about 1–30 minutes.

The preparation of semipermeable microcapsules by other techniques such as coacervation is well known. In the coacervation technique, a polymer is dissolved in a solvent which is a non-solvent for the medium which will end up inside the capsule. A substance is added which causes "salting out" of the polymer at the interface of the droplets of the medium which will end up inside the capsule. This technique is described in more detail by Luzzi in *Jour. Pharm. Sci.*, vol. 59, No. 10, pp. 1367–1376 (Oct. 1970) and by Zaborsky in *Immobilized Enzymes*, Chapter 7, CRC Press, division of Chemical Rubber Co., Cleveland, Ohio (1973).

The capsules can be harvested by sedimentation in a gravitational, centrifugal or magnetic field. The supernatant liquid is discarded and the remaining pellets are dispersed in a concentrated (20–100%) solution of a water-soluble detergent. Water-soluble nonionic detergents such as sorbitan monolaurate may be utilized. The capsule-detergent dispersion is diluted with water or a water-miscible organic solvent and the microcapsules are isolated by sedimentation. The resulting capsules are washed by repeated suspension in and sedimentation from fresh portions of water, a suitable aqueous solution, or an organic solvent.

The microcapsules generally have sizes of about 0.5 to 300 microns. Since the size of the microcapsules can be controlled during their preparation, the specific size prepared will depend upon the intended use of the microcapsule. Preferably the microcapsules have sizes of about 1–200 microns.

The microcapsules of this invention are useful in a wide variety of applications. Capsules containing only silica gel are highly effective as packing material for liquid and gas chromatographic columns. Microcapsules containing a catalytic material may be used in a wide variety of catalytic reactions involving either aqueous or organic media. It is quite surprising that the catalyst in these microcapsules provides a high degree of catalytic activity in the presence of silica gel. Apparently the silica gel is sufficiently porous that the reaction medium readily passes therethrough.

EXAMPLES OF THE INVENTION

The following examples, illustrating the novel microcapsules of this invention and suitable methods for their preparation, are given without any intention that the invention be limited thereto. All percentages are by weight except where otherwise specified. All enzymes employed in these examples were obtained from the Worthington Biochemical Corporation.

EXAMPLE 1

Microencapsulation of a Silicate Ester

To a 4-oz wide-mouth jar was added 1.0 g of acicular iron, 25 ml of tetraethyl orthosilicate, 1.2 ml of sebacyl chloride, and 25 ml of 0.5% aqueous polyvinyl alcohol solution (Elvanol 50–42 Du Pont Co.). This mixture was emulsified with a Model E-1 Vibro-mixer equipped with a 45 mm type P-1 stainless steel stirrer disc (Chemapec, Inc.) for 1 minute. Stirring was continued and interfacial polycondensation was carried out by addition of a solution of 12.5 ml of water, 2.0 g of sodium carbonate and 1.7 ml of 70% 1,6-hexamethylenediamine. Reaction was continued for an additional 20 minutes, and the reaction mixture was decanted into 300 ml of 1N hydrochloric acid and rolled overnight on a roller mixer to effect hydrolysis of the silicate ester. The capsules became rigid as evidenced by the ability to dry them with little or no loss of spherical shape.

EXAMPLE 2

Post Treatment of Microcapsules with a Silicate Ester

To a 4-oz. wide-mouth jar was added 1 g of magnetic iron oxide ($Fe_3O_4$) treated by the method of Papell (NASA-TN-D-4676), 3.0 ml of a 0.8M aqueous hexamethylenediamine solution, pH 8.5 (pH adjustment was made with glacial acetic acid), and 3.0 ml of a 23% aqueous solution of the potassium salt of polyvinylsulfuric acid. The mixture was dispersed by sonication, with a microprobe (Ultrasonics, Inc.), at 110 watts for 30 seconds, and 30 ml of a 1:4 chloroform/cyclohexane solution containing 10% by volume of sorbitan trioleate (Span 85, ICI America, Inc.) was added and the mixture emulsified as described in Example 1. Interfacial polycondensation was carried out by adding a solution of 0.4 g of trimesoyl chloride in 30 ml of 1:4 chloroform/cyclohexane solution. Stirring was continued for 3 minutes and the reaction mixture was centrifuged for 30 seconds in a clinical desk top centrifuge. The supernatant liquid was discarded, and the pellets of water filled microcapsules were dispersed in 25 ml of 50% aqueous sorbitan monolaurate (Tween 20) solution. This dispersion was diluted with 100 ml of distilled water and centrifuged as before.

The capsules were suspended in 50 ml of absolute ethanol, and they were washed 3 times with 50 ml portions of ethanol by repeated suspension in a centrifugation from each portion of wash solvent. The capsules were further washed 3 times with 50 ml portions of tetraethyl orthosilicate using the same procedure. Finally, the pellets were suspended in 25 ml of 50% sorbitan monolaurate solution, and the suspension was added to 50 ml of 1N hydrochloric acid solution. The capsules were washed, as described, three times with 50 ml portions of 1N hydrochloric acid. Finally, the capsules were allowed to stand in 50 ml of 1N hydrochloric acid solution to complete hydrolysis of the silicate ester. The rigid capsules were separated and dried.

EXAMPLE 3

Microencapsulation of Colloidal Silica

To a 4-oz. wide-mouth jar was added 10 ml of colloidal silica (Ludox SM-30, Du Pont Co.), 1.0 ml of N,N,N',N'-tetramethylethylenediamine, 0.3 ml of 95% diethylenetriamine, and 30 ml of a 1:4 chloroform/cycloexane mixture to which 10% by volume of sorbitan trioleate was added. The mixture was emsulified as described in Example 1, and interfacial polycondensation was carried out by addition of 0.4 g of trimesoyl chloride in 30 ml of 1:4 chloroform/cyclohexane solvent. Reaction was continued for 3 minutes and the mixture was separated by centrifugation for 1 minute. The supernatant liquid was discarded and the pellets were suspended in 25 ml of 50% aqueous sorbitan monolaurate solution. This suspension was diluted to 100 ml with absolute ethanol and centrifuged as before. The capsules were washed 3 times by repeated suspension in, and centrifugation from, absolute ethanol.

The 1–5μ capsules were found to have excellent properties as a chromatographic column packing material. A column (0.7 × 20 cm) packed in absolute ethanol and run under 10 lbs/in$^2$ pressure of argon with ethanol as the developing solvent readily separated the Wunsch-Heindrich substrate (Hoppe-Seyler's Z. Physiol. Chem., vol. 332, p. 300, 1963) and its collagenase cleavage product. The cleavage product was eluted first after 15 ml of eluting solvent had passed through the column at a rate of 1 ml per hour. The column is designed for operation at very high pressures where substantial flow rates occur. Comparison of the resolving power of the microcapsule column with columns of very find silica gel preparations commercially available show the microcapsule column to be superior.

EXAMPLE 4

The method of Example 3 was repeated except that N-methylmorpholine was used in place of N,N,N',N'-tetramethylethylenediamine, ethylenediamine was used in place of 95% diethylenetriamine, and 0.4 ml of sebacyl chloride was used in placed of 0.4 g of trimesoyl chloride. Rigid microcapsules were obtained.

EXAMPLE 5

The method of Example 3 was again repeated except that a larger particle size colloidal silica (Ludox HS, Du Pont Co.) was used in place of Ludox SM-30, sorbitan monooleate (Span 80, ICI America, Inc.) was used in place of sorbitan trioleate, 1,1,2-trichloro-1,2,2-trifluoroethane was used in place of the solvent mixture, N,N-dimethylethanolamine was used in place of N,N,N',N'-tetramethylethylenediamine, 0.43 ml of 70% 1,6-hexamethylenediamine was used in place of 0.3 ml of 95% diethylenetriamine, and 0.4 ml of 1,12-dodecanedioyl chloride was used in place of 0.4 g of trimesoyl chloride. Rigid microcapusles were obtained.

EXAMPLE 6

Colloidal Silica/Trypsin/$CrO_2$ Microcapsules

To a 4-oz. wide-mouth jar was added 10 ml of colloidal silica (Ludox SM-30), 1.0 ml of N,N,N',N'-tetramethylethylenediamine, 1 ml of 0.001N HCl containing 100 mg of trypsin (192 $\mu$/mg), 0.3 ml of 95% diethylenetriamine, 500 mg of $CrO_2$ and 30 ml of a 1:4 chloroform/cyclohexane mixture to which 10% by volume of sorbitan trioleate was added. The mixture was emulsified as described in Example 1, and interfacial polymerization was carried out by addition of 0.4 g of trimesoyl chloride in 30 ml of 1:4 chloroform/cyclohexane solvent. Reaction was continued for 3 minutes and the mixture was separated by centrifugation for 1 minute.

The supernatant liquid was discarded and the pellets were suspended in 25 ml of 50% aqueous sorbitan monolaurate solution. This suspension was decanted into 500 ml of distilled water, and the capsules were recovered from the suspension with the aid of a large permanent magnet covered with a removable "skin" of plastic. The enclosed magnet was immersed in the suspension and was then withdrawn with the capsules attached. The capsules were rinsed with distilled water while attached to the magnet. The film was then separated from the magnet and the capsules washed free with 0.001M hydrochloric acid.

The capsules were highly active in cleaving the synthetic trypsin substrate, p-toluenesulfonyl-L-arginine methyl ester, in an assay procedure based on the method of Hummel (Can. Jour. Biochem. Physiol., Vol. 37, p. 1393, 1959).

EXAMPLE 7

Colloidal Silica/Urease/$Fe_3O_4$ Microcapsules

To a 4-oz. wide-mouth jar was added 10 ml of colloidal silica (Ludox SM-30), 1.0 ml of N,N,N',N'-tetramethylethylenediamine, 1 ml of 0.001N HCl containing 60 mg of urease (50 $\mu$/mg), 0.3 ml of 95% diethylenetriamine, 500 mg of magnetic iron oxide ($Fe_3O_4$) and 30 ml of a 1:4 chloroform/cyclohexane mixture to which 10% by volume of sorbitan trioleate was added.

The mixture was emulsified and interfacial polycondensation carried out with 0.4 ml of trimesoyl chloride as described in Example 6. The magnetic capsules were isolated and washed by repeated suspension in, and centrifugation from, distilled water. They were highly active in decomposing aqueous 5% urea solutions as evidenced by (1) a rapid increase in the pH of the urea solution to which the microcapsules were added, and (2) the detection of ammonia in the solution.

EXAMPLE 8

Colloidal Silica/Carbonic Anhydrase/$Fe_3O_4$ Microcapsules

To a 4-oz. wide-mouth jar was added 10 ml of colloidal silica (Ludox SM-30), 1.0 ml of N,N,N',N'-tetramethylethylenediamine, 1 ml of 0.001N HCl containing 30 mg of carbonic anhydrase (3440 $\mu$/mg), 0.3 ml of 3-aminopentamethylenediamine, 500 mg of magnetic iron oxide ($Fe_3O_4$) and 30 ml of a 1:4 chloroform/cyclohexane mixture to which 10% by volume of sorbitan trioleate was added. The mixture was emulsified and interfacial polycondensation carried out with 0.4 ml of trimesoyl chloride as described in Example 6. The magnetic semipermeable microcapsules were isolated and purified as described in Example 7. They were highly active when assayed by the electrometric method of Wilbur and Anderson (Jour. Biol. Chem., vol. 176, p. 147, 1948).

EXAMPLE 9

A mixture of 0.1 g of platinum oxide, 0.5 g of iron powder, 0.1 ml of N,N,N',N'-tetramethylethylenediamine, 0.3 ml of 3-amino-1,5-pentamethylenediamine and 10 ml of aqueous colloidal sol containing 30% of colloidal silica (Ludox SM-30) was homogenized by sonication for 1 minute. This suspension was emulsified by vigorous stirring with 30 ml of a 1:4 by volume chloroform-cyclohexane solution containing 0.3 g of sorbitan trioleate for 1 minute. A solution of 0.35 g of trimesoyl chloride in 30 ml of 1:4 chloroform-cyclohexane was added and stirring was continued for 15 minutes. The water filled capsules formed were recovered by centrifugation, and the packed lower layer of capsules was suspended in 10 ml of a 50% solution of sorbitan monolaurate in water. The capsules were again centrifuged, taken up in 30 ml of 85% alcohol, centrifuged, taken up in 30 ml of absolute ethanol, centrifuged and taken up in 30 ml of diethyl ether. The capsules were removed from the ether suspension with an electromagnet and dried at 100°C. The semipermeable microcapsules (3.74 g) were obtained as a free-flowing black powder.

A 1-g aliquot of the dry capsules was used for hydrogenation of 20 g of styrene in 25 ml of ethanol. After 3 hours, hydrogenation was complete as indicated by the absence of a styrene peak by gas chromatographic analysis. The capsules were centrifuged, washed with ethanol and isolated magnetically from alcoholic suspension. They were resuspended in 20 g of styrene and 25 ml of ethanol and shaken with hydrogen. In 1.75 hours, reduction was 64.5% complete. The capsules were reisolated in the same manner and reused again. A 93% reduction was effected in 3.75 hours. Thus, the catalyst was still active after three reductions.

EXAMPLE 10

Silica-filled semipermeable microcapsules were prepared by the procedure of Example 9 by replacing the iron powder and platinum oxide with 0.5 g of $CrO_2$. A 2-g aliquot of the capsules was impregnated with a saturated solution of $Ni(OCOCH_3)_2 \cdot 4H_2O$ in 95% ethanol, washed with tetrahydrofuran and then with ether and dried at 100°C. The weight gain was 0.5 g. A 1.0 g aliquot of the capsules was treated with 5 ml of 0.5M sodium borohydride solution in 95% ethanol to effect reduction of the nickel salt to metallic nickel and the resulting capsules agitated with 5 g of octene-1 and 5 g of octene-2 (cis-trans isomers) under 40 psi hydrogen pressure. After 30 minutes the product composition, as determined by gas chromatographic analysis on an ester-amide column at 40°C. and 50 ml of helium/minute, was 46% n-octane, 3.0% octene-1 and 51% mixed cis/trans-octene-2. Thus, a catalyst active for hydrogenation of $\alpha$-olefins, but not $\beta$-olefins, has been formed within the capsules.

EXAMPLE 11

A 0.5-g aliquot of $SiO_2$-filled capsules containing $CrO_2$, prepared as in Example 10, was impregnated with 2 ml of a dimethylformamide solution containing 0.1 g $(C_5H_4N)_4RhCl_2$, prepared according to *Jour. Catalysis*, vol. 24, p 536 (1972). The excess solution was evaporated and a solution of $NaBH_4$ in dimethylformamide passed through the capsules to effect formation of an active metallic rhodium catalyst. The capsules were used to reduce 2.5 g of norbornadiene in 20 ml of dimethylformamide solution. Hydrogen uptake ceased after 30 minutes of shaking. The capsules were isolated from the solution with a magnet and returned to a fresh solution of norbornadiene in dimethylformamide. Reduction started immediately on repressuring with hydrogen and shaking. When gas uptake ceased, the reduction was stopped, the capsules isolated, and reduction repeated. After four such hydrogenations, the catalyst was still active. A gas chromatographic analysis of the reduction products showed only traces of norbornadiene remaining in the solutions.

EXAMPLE 12

Sodium Silicate/Trypsin/$Fe_3O_4$ Microcapsules

To a 4-oz wide-mouth jar was added 10 ml of a 40% aqueous sodium silicate solution, 400 mg of magnetic iron oxide ($Fe_3O_4$) and 0.5 ml of 70% aqueous 1,6-hexamethylenediamine. This mixture was sonicated for 1 minute with a microprobe sonifier. Trypsin (100 mg) was dissolved in the mixture, and the resulting mixture was emulsified for 1 minute with b 30 ml of a 1:4 cyclohexane/1,1,2-trichloro-1,2,2-trifluoroethane solution containing 10% by volume of sorbitan monooleate. Interfacial polycondensation was carried out by adding a solution of 0.4 ml of sebacyl chloride in 30 ml of 1:4 cyclohexane/1,1,2-trichloro-1,2,2-trifluoroethane solution. Stirring was continued for 3 minutes, and 2 ml of glacial acetic acid was added to solidify the encapsulated sodium silicate solution. Stirring was continued for an additional 2 minutes and the capsules were isolated, washed, and finally assayed as described in Example 6.

EXAMPLE 13

Sodium Silicate/Potassium Gibberellic Acid Salt Microcapsules

The method of Example 12 was repeated except that trypsin was replaced with 100 mg of potassium gibberellic acid salt, and the iron oxide and sonication were omitted. The capsules were isolated and washed as described in Example 6, and finally washed 3 times with absolute ethanol and dried at 70°C for 12 hours.

The biological activity of the microcapsules in slowly supplying the plant growth hormone was measured on germinating peas. As little as 1 mg of the dried capsules gave a dramatic elongation of the pea epicotyl. The capsules are thus useful for the slow release of biologically active materials, extending the duration of effects of chemicals from a single appliciation.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

I claim:

1. A semipermeable microcapsule which comprises an outer semipermeable polymeric skin selected from the group consisting of polystyrene, collodion, ethylcellulose, cellulose acetate butyrate, polyamide, polyurethane, polysulfonamide, polyurea, polyester and polycarbonate encapsulating therein a silica gel.

2. The semipermeable microcapsule of claim 1 in which the polymeric skin is a condensation polymer.

3. The semipermeable microcapsule of claim 2 in which the condensation polymer is a polyamide.

4. The semipermeable microcapsule of claim 3 in which the silica gel is formed from colloidal silica.

5. The semipermeable microcapsule of claim 3 in which the silica gel is formed from a silicate solution.

6. The semipermeable microcapsule of claim 3 which also contains a heterogeneous catalyst.

7. The semipermeable microcapsule of claim 3 which also contains a membrane-impermeable, homogeneous catalyst.

8. The semipermeable microcapsule of claim 7 in which the homogeneous catalyst is an enzyme.

9. The semipermeable microcapsule of claim 3 which also contains a ferromagnetic material.

10. The semipermeable microcapsule of claim 3 which also contains a heterogeneous catalyst and a ferromagnetic material.

11. The semipermeable microcapsule of claim 3 which also contains a membrane-impermeable, homogeneous catalyst and a ferromagnetic material.

* * * * *